Oct. 23, 1928.  
J. G. ALDINGER  
MEASURING CAN FILLER  
Filed June 19, 1925

Inventor  
Jacob G. Aldinger  
By Dodge and Sons  
Attorney

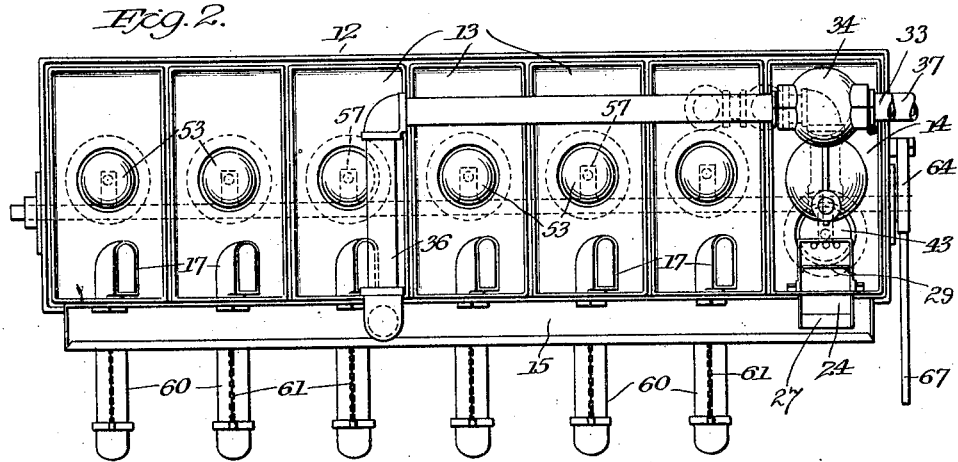
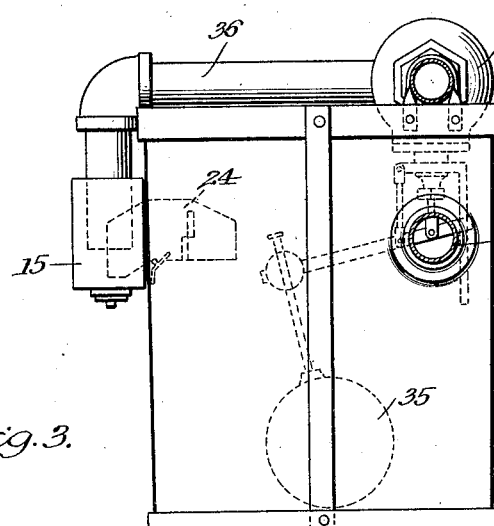
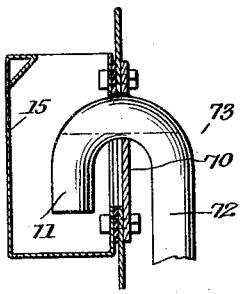
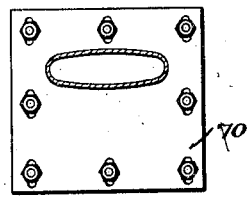
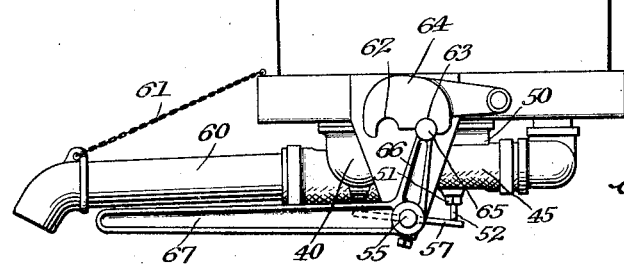

Oct. 23, 1928.
J. G. ALDINGER
1,688,773
MEASURING CAN FILLER
Filed June 19, 1925     3 Sheets-Sheet 3
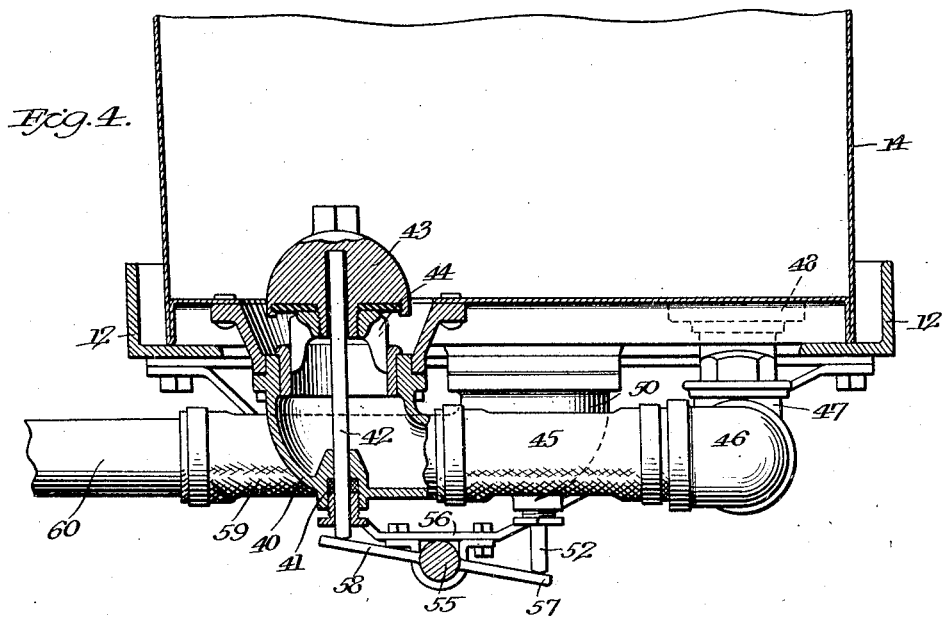
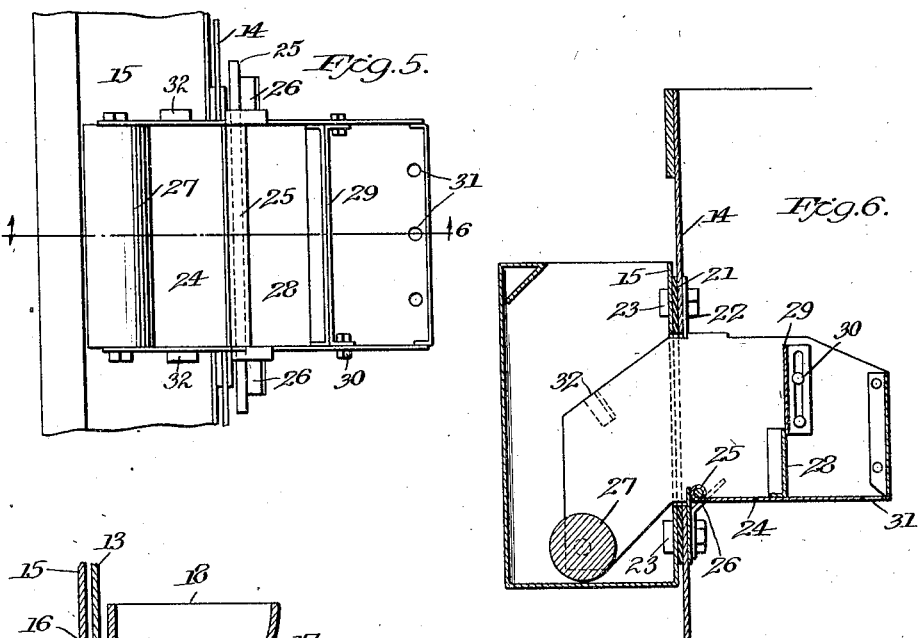
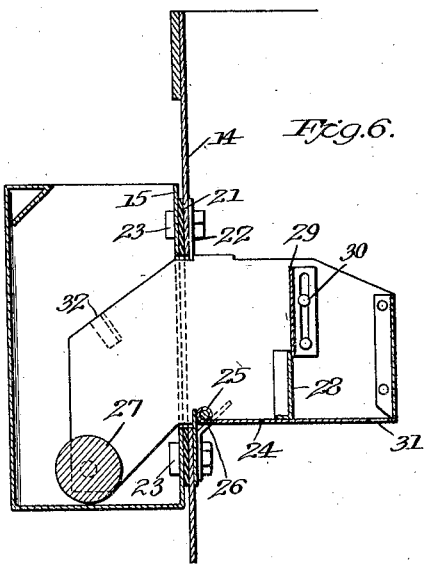
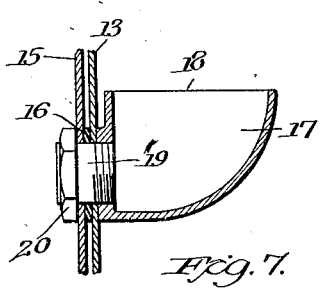

Patented Oct. 23, 1928.

1,688,773

UNITED STATES PATENT OFFICE.

JACOB G. ALDINGER, OF YORK, PENNSYLVANIA, ASSIGNOR, BY MESNE ASSIGNMENTS, TO YORK ICE MACHINERY CORPORATION, OF YORK, PENNSYLVANIA, A CORPORATION OF DELAWARE.

MEASURING-CAN FILLER.

Application filed June 19, 1925. Serial No. 38,320.

This invention relates to liquid measuring devices and particularly to multiple can fillers for use in ice plants.

The purpose of the invention is to provide a device which is rapid in action, accurate in its measuring function, and in which the capacity of the various measuring chambers may be adjusted within reasonable limits. The simple and inexpensive character of the construction used is an important commercial factor.

Generally stated, the measurement is effected in the following way: The water supplied to the device is controlled by a float valve and enters a trough-like manifold whose top is above the maximum desired levels in the measuring chambers, and whose bottom is below the lowest filled level in any such chamber. The water flows from the manifold to the measuring chambers and also from the measuring chambers back to the manifold over individually adjustable overflows, the final quantity in each chamber being gauged by such back flow.

An automatic draining device such as a tilting weir or a siphon is provided to preserve normally a high level in the manifold above the desired levels in the measuring chambers and to drain the manifold to a lower level if the high level be exceeded. Thus the manifold supplies water to the measuring chambers until these fill. When they have filled the level in the manifold rises and tilts the weir, or starts the siphon which rapidly drains the manifold to a level below the over-flows to the measuring chambers. This starts back flow from the measuring chambers to the manifold, the adjustment of the various over-flows determining the quantities retained in the measuring chambers.

The water drained from the manifold by the weir or siphon is fed to a chamber called the control chamber, and the rise of liquid level therein is used to close the float valve which controls the supply of water to the manifold. It follows that the manifold is drained to a low level, the water flowing back from the measuring chambers being carried off to the control chamber. When flow over the tilting weir or through the siphon ceases they resume a condition to maintain the high level.

Each measuring chamber is provided with a drain valve through which the water flows to a corresponding ice can. There is also a valve for draining the control chamber through a check valve into one or more of the measuring chambers. The measuring chamber drain valves and the control chamber drain valve are opened in strict alternation by a single maneuvering mechanism. When the measuring chamber drain valves are open, the water in the control chamber is retained therein. When the drain valves in the measuring chambers are closed, the drain from the control chamber is opened, permitting the water to flow from the control chamber into a measuring chamber or chambers. The resulting fall of water level in the control chamber opens the control chamber float valve to admit water to the manifold, and start the next cycle.

Minor features of the invention are adjustable overflows in the form of angle fittings which may be swivelled to effect adjustment, and a special tilting weir which operates to maintain one level in the manifold until the weir is over-flowed and which then drops and maintains a lower level in the manifold so long as flow over the weir persists.

While I prefer the tilting weir described, I may substitute for it any known device, such as a self-starting siphon, which operates under normal conditions to retain a definite high liquid level and which, if said level be exceeded, operates to reduce the liquid level through a definite range and thereafter permits the original high level to be restored.

In the drawings which represent preferred embodiments of the invention,

Fig. 2 is a plan view thereof;

Fig. 3 is an end elevation on a somewhat enlarged scale;

Fig. 4 is a still further enlarged vertical section through the lower portion of the float chamber;

Fig. 5 is a plan view of the tilting weir;

Fig. 6 is a vertical section on the line 6—6 of Fig. 5;

Fig. 7 is a vertical section through one of the adjustable over-flows mounted in position;

Fig. 8 is a view of a self-starting siphon which may be substituted for the weir;

Fig. 9 is a fragmentary view, partly sectional, showing the shape of the siphon tube of Fig. 8.

Figure 1:
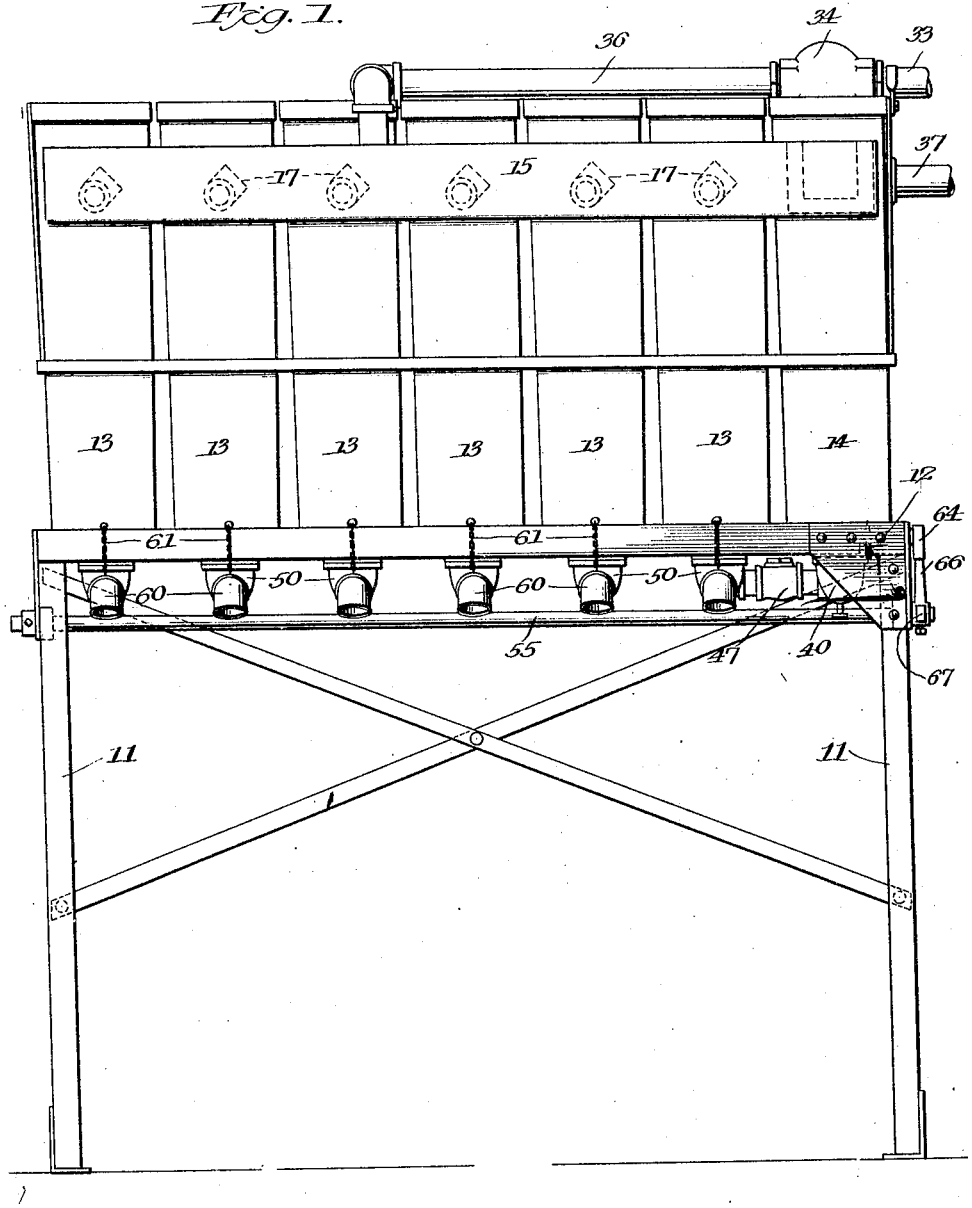
Fig. 1 is a front elevation of the complete device.

The measuring structure proper is carried on a frame work indicated generally by the numeral 11. This frame work may assume any suitable form and may be a part of the frame work of the can dump (not shown) or may be a suitable bracket or frame work attached to the building. On the top of the frame work is mounted a rectangular can seat 12 formed of angle iron arranged with one flange projecting vertically upward and the other flange projecting horizontally inward.

On the can seat 12 rests a multiple can unit consisting in the example illustrated of seven cans connected together in any suitable manner. Six of these cans, indicated by the reference numeral 13, are measuring chambers, and the seventh, represented by the reference numeral 14, is the control chamber and performs no measuring function. I find it convenient to make use of an ordinary multiple ice can unit because these are standard in construction and the cans conform in size and capacity with the cans to be filled. In the example illustrated the cans 13 and 14 merely rest on the can seat 12 and retain themselves in position by their own weight. They can be fixed in place if desired.

A manifold trough 15 extends along the sides of all the cans 13 and 14, reaches both above and below the filled water level, and is the means by which water is conveyed to the various cans. This trough has round apertures which register with corresponding apertures formed in the six measuring cans 13. A water-tight connection between the manifold and each of the cans 13 is afforded by means of a gasket 16 (see Fig. 7) which is interposed between the wall of the can 13 and the wall of the trough 15. For each can there is an angle fitting 17 which has a straight over-flow crest 18 and a tubular nipple 19 projecting through the registering openings in the walls of the can and manifold. This nipple receives a clamping nut 20 which is threaded on the nipple and which draws the walls of the can and manifold together to place the gasket 16 under sealing pressure. In this way the manifold trough is sealed to the sides of the measuring cans by means of a series of nipples 19. The axes of the nipples 19 are horizontal and the crests 18 are parallel thereto. Hence by swivelling the fitting 17 on the nipple, the effective height of the crest 18 can be varied.

The connection from the manifold 15 to the control can 14 is constructed in a somewhat similar manner. Here the wall of the can 14 and the wall of the manifold trough 15 are provided with a registering rectangular opening which is surrounded by a gasket 21. A reinforcing strip 22 surrounds the opening within the can and a plurality of bolts 23 serves to supply the necessary connection and clamping pressure around the rectangular opening.

The tilting weir mounted to fill the last-named opening consists of an open topped, box-like member 24 which projects through the rectangular opening just described and fills the same. It is pivoted on a pintle 25 which rests on the lugs 26 (see Fig. 6) and is held in the normal position shown in Fig. 6 by means of a counter weight 27. Extending across within the tilting member 24 is a fixed weir 28 having a vertically adjustable crest section 29 which may be set and clamped in position by means of the bolts 30 to define the maximum level in the manifold trough 15. When the level in the trough 15 rises high enough, water overflows the top of the adjustable crest section 29 of weir 28 and accumulates within the space in the box-like member 24 beyond the weir 28. This space is drained, but only at a restricted rate, by the ports 31.

Consequently, when flow over the weir 28 starts and continues, the accumulation of water beyond the weir will over-balance the counter weight 27 and lower the crest 29 of the weir. The downward movement of the weir 28 is limited by the collision of the stop 32 with the wall of the trough 15 and the weir will stay in its lowermost position until the out-flow through the ports 31 is sufficient to carry away any water flowing over the crest 29, at which time the counterweight 27 will restore the parts to their normal position.

When the device is properly adjusted for operation the upper position of the crest 29 of the weir 28 will be higher than the crest 18 of each of the fittings 17, and in the lower position the crest 29 of the weir 28 will be at least as low as, and preferably somewhat lower than the lowest crest 18 of any of the fittings 17.

The supply of water for filling the measuring chambers is brought by a pipe 33 to a float-actuated valve 34 whose float 35 is in the control can 14 and is lifted by the rise of water therein. From the valve 34 this water flows by way of a pipe 36 to the manifold trough 15 which it enters near the mid-length thereof. The control can 14 is provided with an over-flow connection 37 by which any excess water may be drained away, but this over-flow does not function in the ordinary operation of the device and is merely a safety connection to prevent flooding of the room in the event that some part should become deranged.

Mounted in the bottom of the can 14 is a valve fitting 40 having a gland 41 through which passes the valve stem 42. This carries at its upper end a weighted valve 43 which is guided in the fitting 40 by means of a spider 44. The fitting 40 is connected by a short length of flexible hose 45 and an elbow 46 with a check valve 47 which in turn is connected by a fitting 48 to the interior of the adjacent measuring can 13. Thus when the valve 43 is opened, if the water level in the can 14 is higher than the water level in the adjacent can 13, water will flow from the can 14 past valve 43 and check valve 47 into the can 13. When the water level in the can 13 equals or exceeds that in the can 14, the check valve 47 closes against back flow. As suggested, such connections may, if desired, be made to more than one can.

Each can 13 is provided with a corresponding discharge valve identical in construction with, but different in purpose from the discharge valve described as mounted in the bottom of the control can 14. So far as the parts of these valves are visible in the drawing, it may be noted that the fitting 50, the gland 51, the stem 52, and the valve 53 are identical in form and function with the parts numbered 40, 41, 42 and 43 previously described.

The valve fittings 50 are all aligned and the valve fitting 40 is off-set relatively thereto so that all the valves may be actuated by a single means and in opposite senses. To effect this result a rock shaft 55 is journaled in brackets 56 and carries a plurality of arms 57 which engage the various valve stems 52, and a single oppositely extending arm 58 which engages the valve stem 42. The valve fittings 50 are connected through short lengths of flexible hose 59 with metal nozzles 60 which are sustained by chains 61. The purpose of this construction is to permit the nozzles to yield if struck. Since the can units when filled are very heavy and are handled by cranes, accidents of this sort are likely to happen and the use of a flexibly mounted nozzle is important.

The shafts 55 may be shifted between two positions, in one of which the valve 43 is held open while all the valves 53 are allowed to close, and in the other of which all the valves 53 are held open while the valve 43 is allowed to close. These two positions are defined by notches 62 and 63 in a weighted impositive detent 64 which engages a head 65 on the shifting lever 66 fast on shaft 55. The arm 66 is the shorter arm of a bell crank whose longer arm 67 projects forward from the shaft 55 and serves as a maneuvering handle therefor.

To adjust the device, the fittings 17 for each can are individually adjusted so that they retain within the can against out-flow to the manifold the desired quantity of water. It should be observed that the cans are levelled for measuring during back-flow from the cans to the manifold. When this adjustment has been made, the adjustable crest 29 of the weir 28 is so set that in its upper position it maintains a level substantially higher than the highest crest 18 of any over-flow fitting 17, and so that in its lowest position it is as low as, and preferably substantially lower than the lowest crest 18 of any fitting 17.

The above adjustments having been made and assuming that a group of cans has just been filled, all the valves 53 will be open and the valve 43 will be closed, retaining in the control can 14 water at such a level that the float 35 is raised and the valve 34 is closed. This is the reverse of the position shown in Figs. 3 and 4. The measuring chambers having completely drained, the handle 67 is shifted to the position shown in Fig. 3, opening the valve 43 and simultaneously closing all the valves 53. The first effect is to drain water from the can 14 to the adjacent can 13. This soon lowers the float 35, opens the valve 34, and starts flow of water to the manifold 15. This water flows over the crests 18 into the various cans 13, and the flow to these cans is so rapid that the level in the manifold does not rise high enough to overflow the weir 28.

One can 13, that adjacent the can 14, will fill first, having received a partial charge of water from the can 14, but the remaining cans 13 will take all the water that the valve 34 can supply and these cans will fill at or about the same time. When they have all filled, the level in the manifold trough 15 and the levels in the various cans 13 will rise until water overflows the weir 28.

Since the ports 31 are inadequate to carry off this water, the box-like member 24 will be over-balanced and will tilt, carrying the weir 28 downward and causing a very rapid flow from the manifold trough 15 into the can 14. This flow raises the level in the can 14, lifts the float 35 and closes the valve 34. At the same time the flow over the crest 29 of the weir 28 will lower the level in the manifold 15 to a point below the lowest crest 18. Back-flow occurs and consequently the final level in each of the measuring cans 13 will be determined by the adjustment of its corresponding crest 18. The can 13 being full, the check valve 47 is held closed, so although the valve 43 is open, no flow can occur from the can 13 to the can 14.

The measuring cans now being full and drained to level, the lever 67 is moved to its lowermost position, opening all of the valves 53 and closing the valve 43. Under these conditions the measured water charges are fed to the various ice cans and the water in the can 14 is retained to hold the float valve 34 closed. When the measuring cans have all emptied, the above described cycle may be repeated by moving the lever 67 to its upper position.

Instead of using the tilting weir, I may make use of any other means of automatically dropping the level of the water in trough 15 from the upper to the lower limits, among which other means is a self-starting siphon such as is shown in Fig. 8. In this case a plate 70 is substituted for the reinforcing strip 22 (see Figs. 5 and 6). This plate supports a siphon tube which has a short leg 71 projecting downward into the trough 15 and a longer leg 72 which projects downward into the control can 14, preferably to a point near the bottom thereof so that it will normally be sealed against the entrance of air. It will be observed that water is always present in the can 14 to effect such sealing, since this can is never completely drained.

The crest formed by the siphon is at the point 73 and this point is above the high level desired in the trough 15 during filling. The lower end of the short leg 71 is at the desired low level in trough 15 and hence below the lowest overflow.

The operation of this modification will be readily understood. When the level in trough 15 rises above the crest 73, flow will start through the siphon, first as a simple overflow from the trough, but once flow occurs in considerable quantity the siphon action will commence and water will be drawn from the trough 15 at a rapid rate. The entire area of the siphon tube is effective under a head equivalent to the difference in levels of the water in trough 15 and the water in can 14, so large capacity is possible.

It is feasible to cause the siphon action to start for a very slight rise of level above the crest 73 by making the vertical transverse measurement of the siphon tube small at this point and the horizontal transverse measurement large enough to give the necessary cross sectional area. A convenient construction is illustrated in Fig. 9, where a flat oval section is shown.

While the construction details above described are preferred by me, I am aware that various modifications are possible within the scope of my invention and hence no limitation to such details is implied beyond what is specified in the claims.

What is claimed is:

1. In a liquid measuring device the combination of a manifold; a plurality of measuring chambers; individually adjustable over-flows between said manifold and said chambers; means for establishing a high liquid level in said manifold to permit filling of said chambers by over-flow from said manifold; and means for establishing a low level in said manifold for fixing the levels in said chambers by over-flow back to said manifold.

2. In a liquid measuring device, the combination of a manifold; a plurality of measuring chambers; over-flows establishing communication between said manifold and chambers; means for supplying water to said manifold and maintaining therein a level higher than said over-flow; automatic means actuated by the filling of said measuring chambers serving to drain said manifold to a level below said over-flows; means rendered active by the action of said draining means and serving to terminate the supply of water to said manifold; means for accumulating the water drained from said manifold; means for discharging the water from said measuring chambers; and automatic means constructed and arranged to deliver said accumulated water to a measuring chamber as an incident to the re-filling of said chambers from said manifold.

3. In a liquid measuring device, the combination of a manifold; a plurality of measuring chambers; over-flows establishing communication between said manifold and chambers; automatic means for maintaining in said manifold a liquid level higher than said over-flows; automatic means actuated by the filling of said chambers serving to drain said manifold to a level below said over-flows; means for accumulating the water drained from said manifold; manually operated valves for draining the measured liquid from said chambers; a valve related to said manually operated valves and arranged to permit flow of said accumulated water to a measuring chamber when said manually operated valves are closed; and a valve arranged to be opened by the discharge of said accumulated water and to be closed by the accumulation thereof, and itself controlling the supply of water to the manifold.

4. In a liquid measuring device, the combination of a measuring chamber; a control chamber; a manifold associated with said chambers; an over-flow between said measuring chamber and said manifold; an automatic level-maintaining device associated with said manifold, arranged to establish a level therein above said over-flow and to drain liquid from said manifold to said control chamber when such level is exceeded and thus establish in said manifold a level below said over-flow; a water supply for said measuring chamber and manifold; a float-actuated valve controlling said supply and arranged to be closed by the rise of level in said control chamber; and means for draining the measuring chamber and the control chamber successively.

5. In a liquid measuring device, the combination of a plurality of measuring chambers; a control chamber; a manifold associated with said chambers; independently adjustable over-flows between said measuring chambers and said manifold; an automatic level-maintaining device associated with said manifold, arranged to establish a level therein above said over-flows and to drain liquid from said manifold to said control chamber when such level is exceeded and thus establish in said manifold a level below said over-flows; a water supply for said measuring chambers and manifold; a float-actuated valve controlling said supply and arranged to be closed by the rise of level in said control chamber; and means for draining the measuring chambers and the control chamber in alternation.

6. In a liquid measuring device, the combination of a measuring chamber; a control chamber; a manifold associated with said chambers; an over-flow between said measuring chamber and said manifold; a weir controlling the flow of liquid from the manifold to the control chamber and shiftable between two positions, in one of which it establishes a level in said manifold above said over-flows, and in the other of which it establishes a level therein below said over-flows; means urging said weir to the first-named position; means actuated by the passage of water over the crest of said weir serving to retain said weir in the last-named position while such flow continues; a water supply for said measuring chamber and manifold; a float-actuated valve controlling said supply and arranged to be closed with the rise of level in said control chamber; and means for draining the measuring chamber and the control chamber successively.

7. In a liquid measuring device, the combination of a measuring chamber; a control chamber; a manifold associated with said chambers; an over-flow between said measuring chamber and said manifold; an automatic level-maintaining device associated with said manifold, arranged to establish a level therein above said over-flow, and to drain liquid from said manifold to said control chamber when such level is exceeded and thus establish in said manifold a level below said over-flow; a water supply for said measuring chamber and manifold; a float-actuated valve controlling said supply and arranged to be closed by the rise of level in said control chamber; and a valve mechanism shiftable between two positions, in one of which it drains said measuring chamber, and in the other of which it permits flow from the control chamber to the measuring chamber while preventing reverse flow.

8. In a liquid measuring device, the combination of a plurality of measuring chambers; a control chamber; a manifold associated with said chambers; independently adjustable over-flows between said measuring chambers and said manifold; an automatic level-maintaining device associated with said manifold, arranged to establish a level therein above said over-flows and to drain liquid from said manifold to said control chamber when such level is exceeded and thus establish in said manifold a level below said over-flows; a water supply for said measuring chambers and manifold; a float-actuated valve controlling said supply and arranged to be closed by the rise of level in said control chamber; and a valve mechanism shiftable between two positions, in one of which it drains said measuring chambers, and in the other of which it permits flow from the control chamber to a measuring chamber while preventing reverse flow.

9. In a liquid measuring device, the combination of a measuring chamber; a control chamber; a manifold associated with said chambers; an over-flow between said measuring chamber and said manifold; a weir controlling the flow of liquid from the manifold to the control chamber and shiftable between two positions, in one of which it establishes a level in said manifold above said over-flow, and in the other of which it establishes a level therein below said over-flow; means urging said weir to the first-named position; means actuated by the passage of water over the crest of said weir serving to retain said weir in the last-named position while such flow continues; a water supply for said measuring chamber and manifold; a float-actuated valve controlling said supply and arranged to be closed with the rise of level in said control chamber; and a valve mechanism shiftable between two positions, in one of which it drains said measuring chamber, and in the other of which it permits flow from the control chamber to the measuring chamber but prevents reverse flow.

10. The combination in a liquid measuring device including a plurality of measuring chambers and a manifold, of a plurality of adjustable over-flows, each establishing over-flow communication between the manifold and said chambers, and each comprising a tubular angle fitting having a straight elongated over-flow crest, the fitting being angularly adjustable on an axis parallel to said crest to vary the elevation thereof.

In testimony whereof I have signed my name to this specification.

JACOB G. ALDINGER.